UNITED STATES PATENT OFFICE.

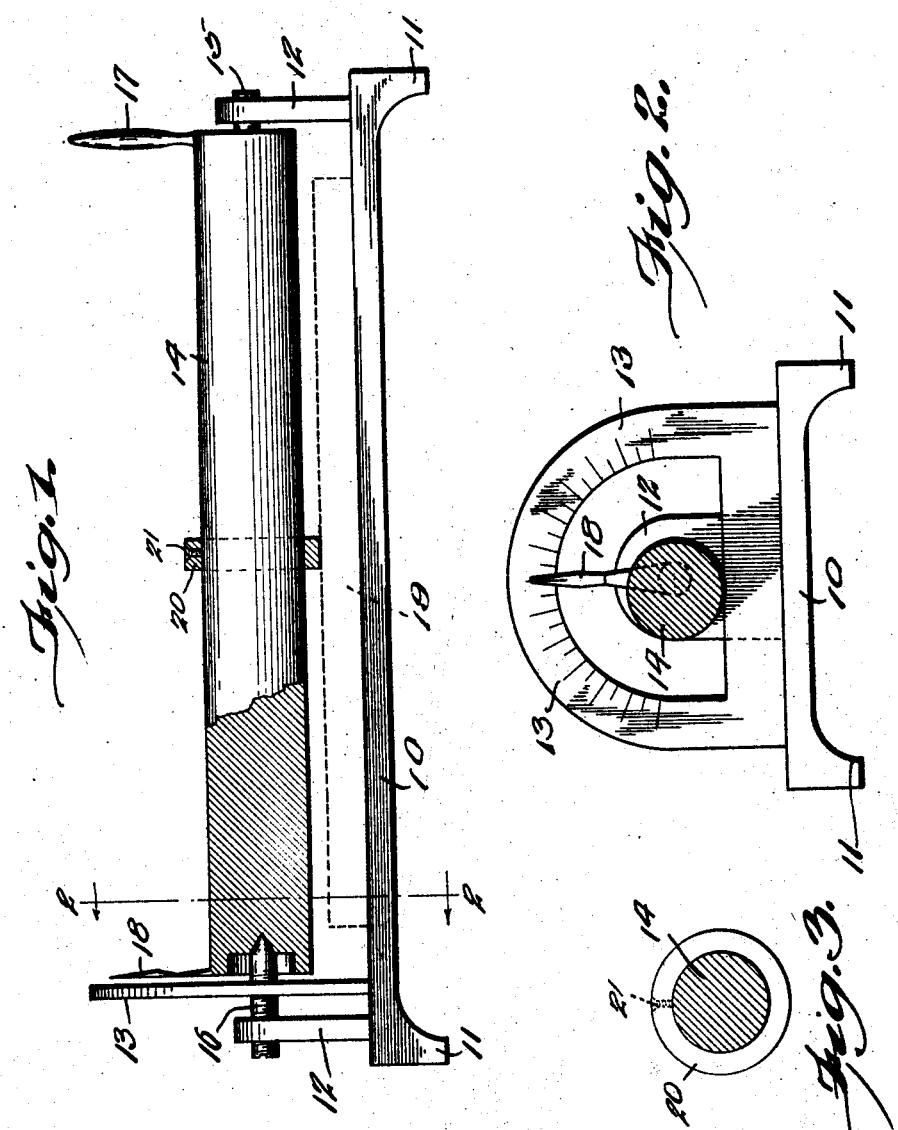

HENRI CIPRIEN PELAMORGUE, OF GRAND MONTROUGE, FRANCE, ASSIGNOR OF ONE-HALF TO MORTON B. CONNELLY, OF PHILADELPHIA, PENNSYLVANIA.

GAGE.

1,392,215.  Specification of Letters Patent.  Patented Sept. 27, 1921.

Application filed October 19, 1920. Serial No. 418,126.

*To all whom it may concern:*

Be it known that I, HENRI CIPRIEN PELAMORGUE, a citizen of France, residing at Grand Montrouge, Seine, France, have invented certain new and useful Improvements in Gages, of which the following is a specification.

This invention relates to gages and has for an object the production of a gage having improved means for determining the thickness of a given body or its variance from the required thickness and of registering the thickness and also the variations.

A further object of the invention is to provide a gage having an eccentric member journaled in such manner that the periphery of the eccentric, in engagement with the object determines the thickness and is provided with a calibrated mechanism, registering the thickness.

A further object of the invention is the employment on the eccentric roller, of a collar, movable along the roller for determining local variations.

With these and other objects in view, the invention comprises certain novel units, parts, elements, combinations and functions as will be hereinafter more fully described and claimed.

In the drawings;

Figure 1 is a view of the improved gage in side elevation with parts broken away to disclose the manner of journaling.

Fig. 2 is a vertical transverse section taken on line 2—2 of Fig. 1.

Fig. 3 is transverse sectional view through the roller showing the movable ring in side elevation.

Like characters of reference indicate corresponding parts through the several views.

The improved gage which forms the subject matter of this application comprises a base 10 which may be supported on any appropriate supports as the feet 11. Adjacent to the ends there are erected upon the base 10 spaced ears 12 and at one end the arcuate scale 13. Between the ears 12 is journaled a roller 14, cylindrical in form but journaled eccentrically relative to its axis of rotation. The journaling may be accomplished in any appropriate manner, here shown as by the conical pintles 15 and 16, the latter being screw threaded for adjustment. The roller is provided with a manual lever 17 by which the roller is rotated upon its axis. The roller also carries an index 18 mounted to move in an arc adjacent to the calibration 13 and co-acting with the latter to enable the user to read the thickness of the object, indicated at 19.

Slidably adjustable upon the roller 14 is a ring 20 having some appropriate means as the set screw 21 for fixing it at any position longitudinally of said roller.

The device is intended especially for gaging the thickness of printing blocks to determine whether they are "type high" but it will be obvious that its utility is not limited to such use. In use the object gaged will be placed upon the base as indicated at 19 and the roller rotated by the lever 17 until the periphery of the roller engages upon the surface of the object, then by observing the position of the index 18 relative to the scale 13 the user instantly determines whether the object is of the required thickness. If the gaging by the use of the roller indirect contact develops the fact that there are local inequalities, the ring 20 is brought into action by being moved to and fixed at the appropriate position and the roller again turned until the ring contacts with the object, the user being able to read the ring measurements from the scales as well as the roller measurements.

It will be obvious that the object may be moved about on the base as it is found desirable or necessary in determining the thickness of various parts of the same.

I claim;

1. A gage comprising a bed, spaced ears upstanding from the bed, a roller positioned in parallelism with the bed and adapted to rotate on an eccentric journal, and a scale embodying means to register the point at which the rotation of the roller is interrupted.

2. A gage comprising a bed, ears spaced upon opposite sides of and upstanding from the bed, a roller carried by the ears and extending in parallelism across the bed and journaled to rotate upon an eccentric bearing, and an indicating mechanism adapted to register the point at which the rotation of the roller is interrupted.

3. A gage comprising a bed, spaced ears upstanding from the bed, a roller journaled in the ears and extending in parallelism above the bed adapted to rotate upon an eccentric axis, an arcuate scale upstanding from the bed, and a pointer carried by the journal moving in juxtaposition to the arcuate scale.

4. A gage comprising a bed, a roller journaled eccentrically and in parallelism relative to the bed, a ring embracing the roller, means to secure the ring at adjustable points along the roller, and an indicating mechanism adapted to indicate the point at which the rotation of the roller is interrupted by the engagement of the ring with an object upon the bed.

5. A gage comprising a bed, ears carried at opposite limits of and upstanding from the bed, a roller journaled in the ears and extending in parallelism above the bed, mounted to rotate upon an eccentric axis, a ring embracing the roller, means to secure the ring rigidly upon the roller at adjusted positions, an arcuate scale upstanding from the bed concentric with the axis of rotation of the roller, and a pointer carried by the axis moving in juxtaposition to the arcuate scale.

In testimony whereof I affix my signature.

HENRI CIPRIEN PELAMORGUE.